No. 865,932. PATENTED SEPT. 10, 1907.
J. PIERSON, Jr.
WHIFFLETREE HOOK.
APPLICATION FILED MAR. 26, 1907.

Attest:
J. P. Hays
J. D. Bradley

John Pierson Jr. Inventor,
By Shear Middleton Donaldson Shear
Attys.

THE NORRIS PETERS CO., WASHINGTON, D. C.

UNITED STATES PATENT OFFICE.

JOHN PIERSON, JR., OF ATTICA, KANSAS.

WHIFFLETREE-HOOK.

No. 865,932.   Specification of Letters Patent.   Patented Sept. 10, 1907.

Application filed March 26, 1907. Serial No. 364,687.

*To all whom it may concern:*

Be it known that I, JOHN PIERSON, Jr., a native citizen of the United States, residing at Attica, Kansas, have invented certain new and useful Improvements in Whiffletree-Hooks, of which the following is a specification.

My invention relates to improvements in whiffletree hooks.

The object of the invention is to produce a strong, durable and efficient construction which may be easily applied to the whiffletree and which when in place will be free from all liability of becoming accidentally detached.

With these and possibly other objects in view, the invention includes the particular features of construction hereinafter described and particularly pointed out in the appended claims.

The invention is illustrated in the accompanying drawings, in which:—

Figure 1:
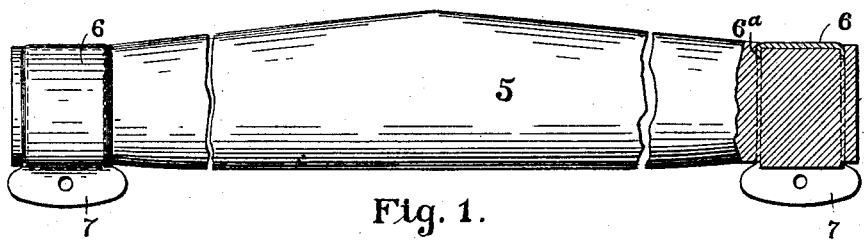
Figure 3:
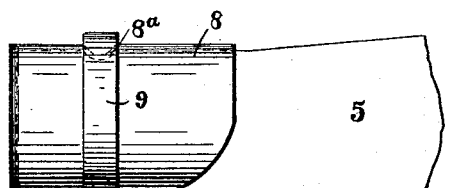
Figure 2:
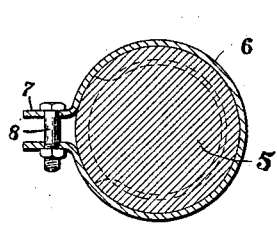

Figure 1 is a plan view of a whiffletree showing the hook attaching device in place, one end being in section. Fig. 2 is a transverse section. Fig. 3 is a plan view of a modified form, and Fig. 4 is a transverse section of the same.

Referring by reference characters to the drawing, the numeral 5 designates the whiffletree which is of wood, and 6 the hook attaching device. This is made of sheet metal having the body curved into nearly complete cylindrical form and having side flanges $6^a$ designed to penetrate the wood to hold the clip against endwise movement and having parallel lips 7 provided with perforations for the reception of the bolt 8 to draw the lips together to clamp the band around the whiffletree. The wood of the whiffletree is provided with annular grooves as shown on the right-hand side of Fig. 1 and in dotted lines in Fig. 2 into which the flanges $6^a$ enter, whereby all danger of the slipping off of the band is prevented.

Figure 4:
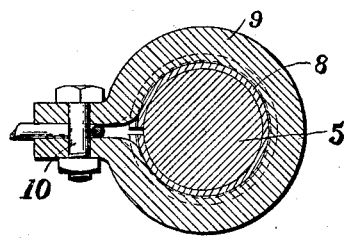

In the modified form shown in Figs. 3 and 4 I provide the end of the whiffle tree with an inclosing metallic sheathing 8 of interrupted cylindrical form which has an inwardly struck portion or annular bead $8^a$ designed to rest in an annular groove in the whiffletree. A split clamping ring 9 having its inner surface designed to fit in the inwardly struck portion of the sheathing rests in the groove formed by such inwardly struck portion and its ends being drawn together by the bolt 10 the entire device is effectually held in position. The whiffletree hook 11 is secured by the bolt 10.

Having thus described my invention, what I claim is:—

In combination, a whiffletree having an annular groove, a metallic sheathing on the end of said whiffletree having an inwardly struck portion designed to rest in the annular groove of the whiffletree, a split clamping ring having an annular bead on its inner surface designed to fit into the inwardly struck portion of the metallic sheathing and means for clamping the ends of said split clamping ring, substantially as described.

In testimony whereof, I affix my signature in presence of two witnesses.

JOHN PIERSON, JR.

Witnesses:
 J. P. HAYS,
 B. G. PHILLIPS.